US010890225B2

(12) United States Patent
Pasquet et al.

(10) Patent No.: US 10,890,225 B2
(45) Date of Patent: Jan. 12, 2021

(54) VEHICLE BRAKE ACTUATOR

(71) Applicant: Chassis Brakes International B.V., Eindhoven (NL)

(72) Inventors: Thierry Pasquet, Vincennes (FR); Philippe Telega, Plailly (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 15/321,237

(22) PCT Filed: Jul. 20, 2015

(86) PCT No.: PCT/FR2015/051989
§ 371 (c)(1),
(2) Date: Dec. 22, 2016

(87) PCT Pub. No.: WO2016/016541
PCT Pub. Date: Feb. 4, 2016

(65) Prior Publication Data
US 2017/0204924 A1    Jul. 20, 2017

(30) Foreign Application Priority Data

Jul. 30, 2014  (FR) .................................... 14 57398

(51) Int. Cl.
*F16D 65/18*  (2006.01)
*F16H 25/22*  (2006.01)
(Continued)

(52) U.S. Cl.
CPC ............ *F16D 65/18* (2013.01); *B60T 13/741* (2013.01); *F16H 25/2252* (2013.01);
(Continued)

(58) Field of Classification Search
CPC .. F16D 65/18; F16D 2121/24; F16D 2125/40; F16D 2125/405; F16D 2125/48;
(Continued)

(56) References Cited

U.S. PATENT DOCUMENTS 4,877,113 A * 10/1989 Taig ...................... B60T 13/741
                                                    188/72.1
5,788,023 A    8/1998 Schoner et al.
(Continued)

FOREIGN PATENT DOCUMENTS

DE    19543098 A1    12/1996
DE    19807328 A1    9/1999
(Continued)

OTHER PUBLICATIONS

International Search Report PCT/ISA/210 for International Application No. PCT/FR2015/051989 dated Oct. 15, 2015.

*Primary Examiner* — Melody M Burch
(74) *Attorney, Agent, or Firm* — Harness, Dickey and Pierce, P.L.C.

(57) ABSTRACT

The vehicle brake actuator which includes a screw, a tapped inner casing in mesh with the screw by means of an irreversible connection, an electric motor controlling movement of the screw in relation to the inner casing or of the inner casing in relation to the screw so that said movement actuates a braking element, threaded inner rollers, the inner rollers each being in mesh firstly with the screw and secondly with the inner casing by means of at least one thread, a tapped outer casing, and outer rollers each in mesh firstly with the inner casing and secondly with the outer casing, the outer rollers having at least one thread oriented in the opposite direction to a thread of the inner casing and in the same direction as a thread of the outer casing.

8 Claims, 2 Drawing Sheets

Figure 3:
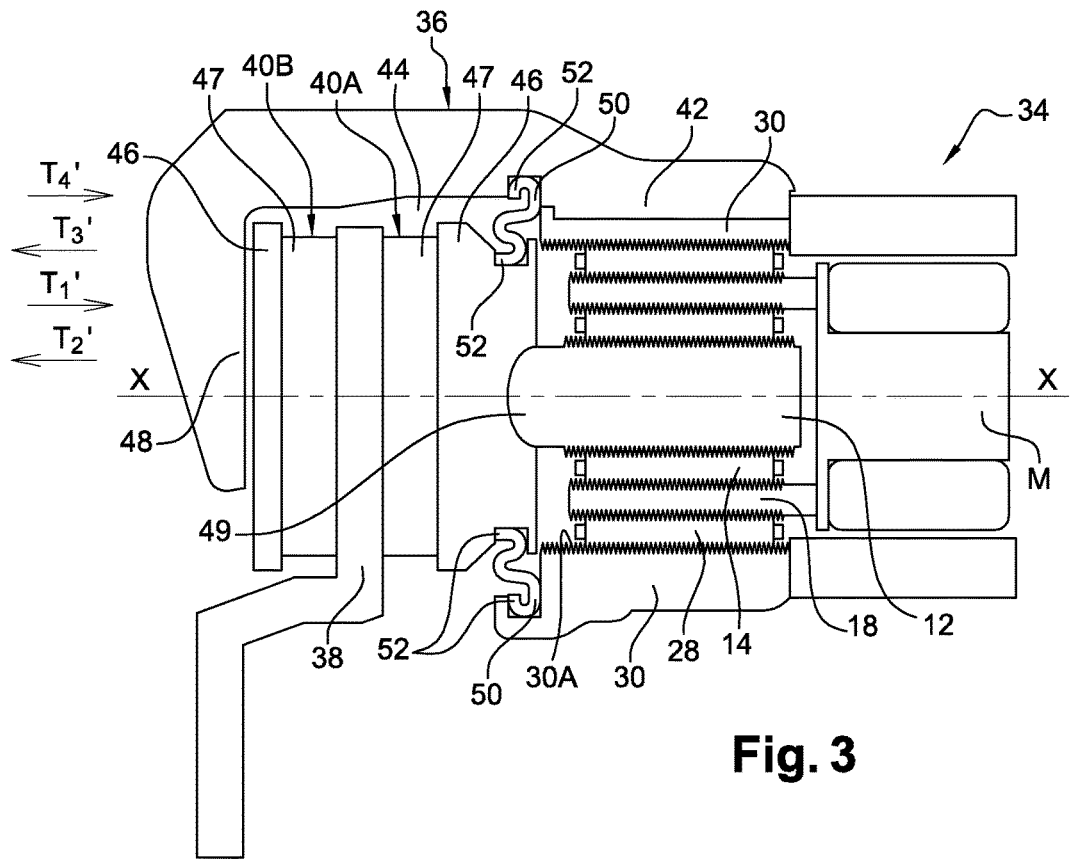

(51) Int. Cl.
*B60T 13/74* (2006.01)
*B60T 13/00* (2006.01)
*F16D 121/24* (2012.01)
*F16D 125/40* (2012.01)
*F16D 125/48* (2012.01)
*F16D 125/50* (2012.01)

(52) U.S. Cl.
CPC ...... *F16D 2121/24* (2013.01); *F16D 2125/40* (2013.01); *F16D 2125/405* (2013.01); *F16D 2125/48* (2013.01); *F16D 2125/50* (2013.01)

(58) Field of Classification Search
CPC . F16D 2125/50; F16H 25/2252; B60T 13/741
See application file for complete search history.

(56) References Cited

U.S. PATENT DOCUMENTS

| | | | |
|---|---|---|---|
| 6,349,801 B1 | 2/2002 | Koth et al. | |
| 6,666,308 B1 * | 12/2003 | De Vries | F16D 65/18 188/156 |
| 7,267,044 B1 * | 9/2007 | Klinger | F15B 15/068 74/89.25 |
| 2004/0069084 A1 * | 4/2004 | Dubus | F16H 25/2252 74/424.92 |
| 2009/0133975 A1 | 5/2009 | Gilles | |
| 2010/0270485 A1 * | 10/2010 | Lovgren | F16K 31/047 251/129.11 |
| 2012/0204665 A1 * | 8/2012 | Baudasse | F16H 25/2252 74/424.92 |
| 2016/0186887 A1 * | 6/2016 | Dubus | F16H 25/2252 251/264 |
| 2017/0219070 A1 * | 8/2017 | Pasquet | F16H 25/2252 |

FOREIGN PATENT DOCUMENTS

| | | |
|---|---|---|
| EP | 1359338 A2 | 11/2003 |
| FR | 2839127 A1 | 10/2003 |
| FR | 2951514 A1 | 4/2011 |
| JP | H08296674 A | 11/1996 |
| JP | 2005133863 A | 5/2005 |
| WO | WO-2007/036357 A1 | 4/2007 |

* cited by examiner

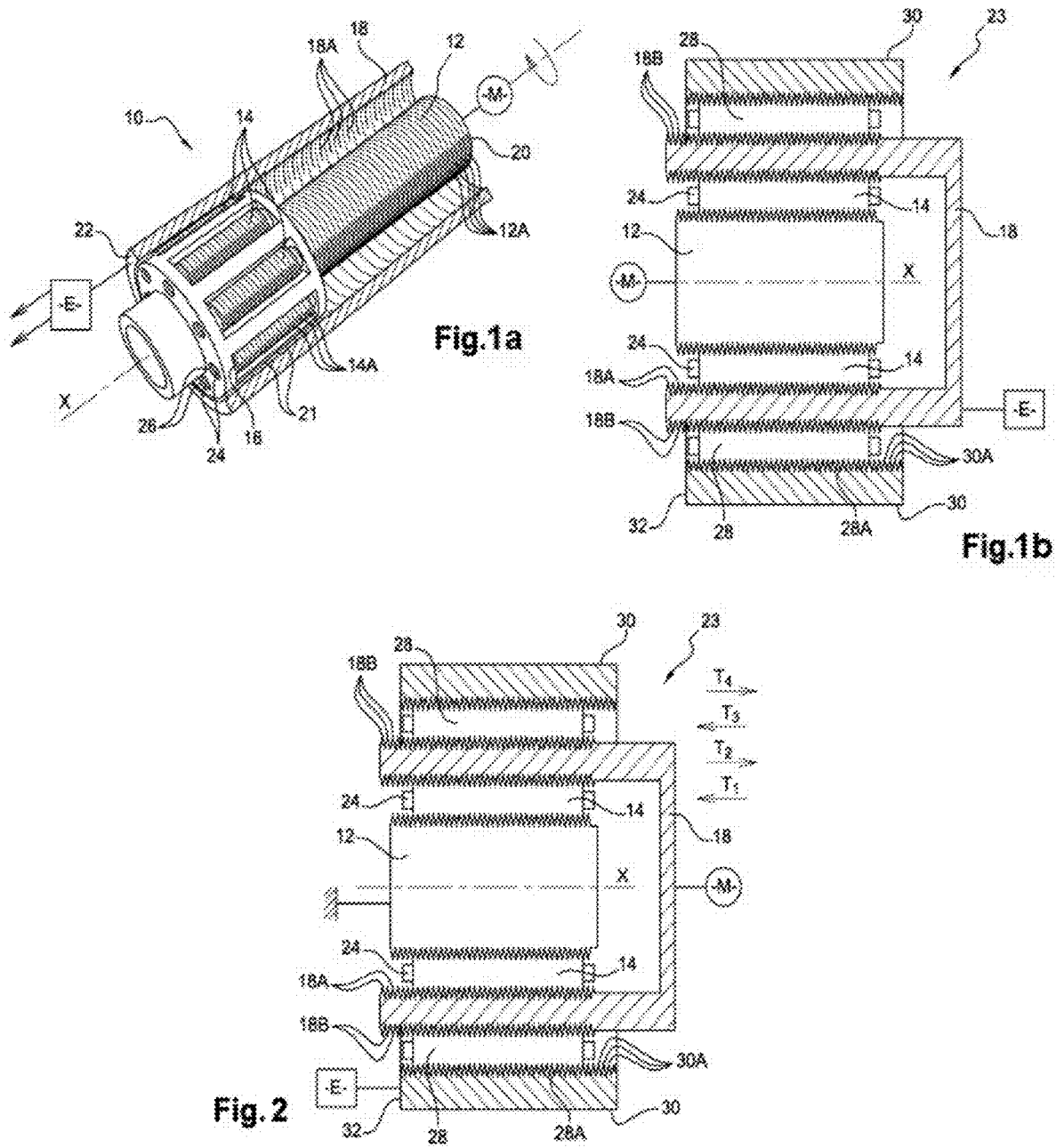

VEHICLE BRAKE ACTUATOR

CROSS-REFERENCE TO RELATED APPLICATIONS

This application is the U.S. National Phase application of PCT Application No. PCT/FR2015/051989 filed on Jul. 20, 2015, which claims priority to French Application No. 1457398 filed on Jul. 30, 2014, the contents of each of which are incorporated herein by reference.

The invention relates to the domain of vehicle brake actuators, and more specifically to the domain of electromechanical brake actuators.

Vehicles that use hydraulic braking devices are known. Such devices use hydraulic actuators notably including a piston designed to push a brake pad against a disk rigidly connected to the wheel of the vehicle.

However, electromechanical braking devices that are actuated electrically rather than hydraulically have begun to appear in recent years. These braking devices are provided with an electromechanical actuator that has the notable advantage of reducing the manufacturing cost of the vehicle as well as the maintenance cost of the vehicle by obviating the need to maintain a hydraulic circuit.

An electromechanical braking device using an electromagnetic braking actuator provided with a ball screw coupled to an electric motor is known in particular from application EP 1359338. The ball screw is designed to transform the rotational movement of the electric motor into a linear movement to push the pad against the brake disk. The ball screw comprises a screw, a casing and balls designed to reduce the friction between the screw and the casing.

The major drawback of the actuator in the prior art is related to the presence of the ball screw that include the feature of reversibility. Reversibility means that an axial force applied to the screw causes the casing to rotate and, reciprocally, an axial force applied to the casing causes the screw to rotate. Reversibility constitutes a major drawback since an unwanted translational movement of the screw or of the casing could affect the reliability of braking and compromise the safety of the passengers in the vehicle.

Furthermore, the use of an electromechanical braking actuator incorporating a ball screw is unsatisfactory in terms of expense.

For this purpose, the invention relates to a vehicle brake actuator comprising:
 a screw,
 a tapped inner casing in mesh with the screw by means of an irreversible connection,
 an electric motor controlling movement of the screw in relation to the inner casing or of the inner casing in relation to the screw so that said movement actuates a braking element,
 threaded inner rollers, the inner rollers each being in mesh firstly with the screw and secondly with the inner casing by means of at least one thread,
 a tapped outer casing, and
 outer rollers each in mesh firstly with the inner casing and secondly with the outer casing, the outer rollers having at least one thread oriented in the opposite direction to a thread of the inner casing and in the same direction as a thread of the outer casing.

Thus, an actuator according to the invention overcomes the aforementioned drawbacks.

Such a brake actuator has the advantage that the screw and the inner casing can only be moved in relation to one another by the rotational movement of the electric motor. Thus, this actuator avoids any unexpected movement of the screw in relation to the inner casing. This is particularly beneficial if the actuator is used in a parking brake arrangement, since it improves the reliability of the braking of a vehicle. Furthermore, the cost of such a brake actuator is particularly low, since it uses elements that are inexpensive and notably easier to manufacture than the elements of an actuator provided with a ball screw.

Furthermore, for this type of actuator, referred to as a two-stage gear-reduction actuator, the orientation in the same direction of the threads of the outer rollers in mesh with the threads of the outer casing improves gear reduction capacity.

Furthermore, since the actuator includes threaded inner rollers, each roller being in mesh firstly with the screw and secondly with the inner casing by means of at least one thread, the actuator acts as a reduction gear and the use of an electric motor turning at high rotational speeds becomes possible. Notably, this enables a low-cost motor to be used.

Preferably, the screw and the inner casing each have a plurality of threads, preferably three threads.

This further increases the gear reduction capacity of the actuator.

For example, the thread of each roller is oriented in the opposite direction to a thread of the screw and in the same direction as a thread of the inner casing.

This enables the gear reduction capacity to be increased up to a ratio of $\frac{1}{180}$.

Also preferably, the rollers mesh directly with the screw and the inner casing.

The inner casing may form a piston designed to actuate the braking element.

This obviates the need to use an additional part designed to move in translation to actuate the braking element.

Advantageously, the screw forms a piston designed to actuate the braking element.

Again, there is no need for an additional dedicated part designed to actuate the movable braking element.

The invention also relates to a vehicle braking device including an actuator as described above, designed to actuate a disk brake, preferably a floating-caliper disk brake.

The invention also relates to a vehicle provided with a braking device, in which the actuator is designed to actuate a service brake or a parking brake.

Accordingly, such an actuator may be used in different brake device arrangements.

Moreover, the device includes an actuator in which the screw and the casings are made of a reinforced polymer.

Figure 4:
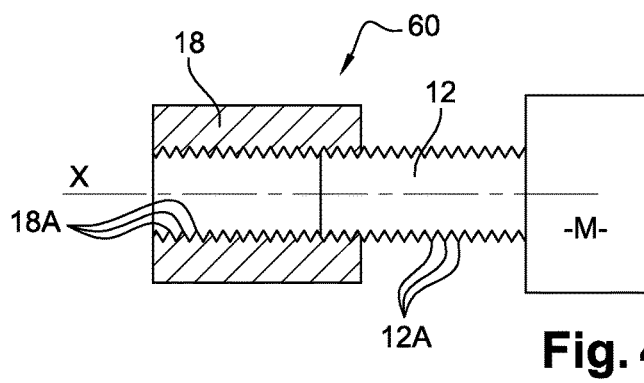
Figure 5:
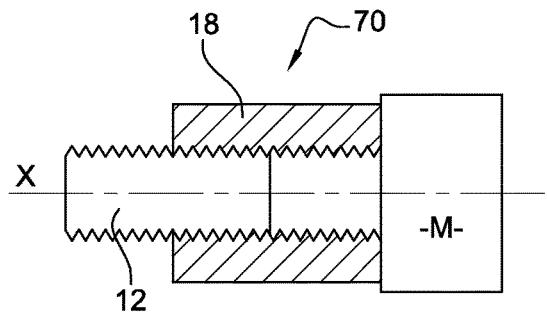

Five embodiments of the invention are described below as nonlimiting examples with reference to the attached drawings, in which:

FIG. 1a is a perspective view of an actuator forming a first embodiment of the invention, in which the casing has been cut away, FIG. 1b is a cross section of the actuator forming the first embodiment of the invention, FIG. 2 is a cross section of an actuator forming a second embodiment of the invention, FIG. 3 is a cross section of a brake actuator forming a third embodiment of the invention, FIG. 4 is a perspective view of a brake actuator forming a fourth embodiment of the invention, and FIG. 5 is a perspective view of a brake actuator forming a fifth embodiment of the invention.

With reference to FIGS. 1a and 1b, in the brake actuator according to the invention, the reduction gear 10 includes an inner screw 12, rollers 14 arranged about the screw, a roller holding cage 16 and a casing 18.

The screw 12 has three threads 12A all oriented in the same first direction. One end 20 of the screw 12 is designed to be rigidly attached to rotational drive means, such as an electric motor M of the actuator. As such, the reduction gear is designed to be controlled electrically. The other end of the screw has a free smooth hollow edge.

The rollers 14 are threaded and the longitudinal axis of same is parallel to the axis X of the screw. Each roller has a single thread 14A that meshes directly with the threads 12A of the screw. The thread 14A of each roller 14 is oriented in the opposite direction to the threads 12A of the screw 12.

The holding cage 16 for the rollers 14 has a cylindrical shape coaxial to the thread 12 and extends along a limited portion of the length of the screw. This cage 16 includes longitudinal seats 21 designed to receive the rollers at regular intervals about the screw. For this purpose, the seats 21 have holes 26 opening out at the ends of the cage. Positioning pins 24 are arranged at the ends of the rollers and are designed to fit into the holes 26 in the seats 21. Thus, each roller 14 is held by the ends of same in a seat 21 of the cage 16. In this example, there are ten rollers and the roller holding cage 16 has ten seats, although there could naturally be a different number of seats depending on the number of rollers used. Thus, each roller 14 is assembled movably in rotation in the respective seat 21 of same.

The casing 18 forms a cylindrical sleeve surrounding the cage 16 and arranged coaxially with the screw 12. The casing 18 has an inner wall provided with six threads 18A oriented in the same direction as the threads 14A of the rollers 14. The casing 18 meshes directly with the rollers. One end 22 of the casing 18 is designed to be rigidly attached to an element E designed to be moved in translation and thus slid in relation to the motor.

Thus, the rollers 14 each mesh directly firstly with the screw 12 and secondly with the casing 18 by means of at least one thread 14A oriented in the opposite direction to a thread 12A of the screw and in the same direction as a thread 18A of the casing 18.

Operation of the reduction gear 10 is described below. The reduction gear 10 is assumed to be driven in rotation by a shaft of a brushless electric motor M designed to turn in both directions of rotation. When the electric motor M is driven in a first direction of rotation, the screw 12 drives the rollers 14 and the cage 16 in rotation about the axis X. Since the rollers 14 are in mesh with the casing 18, the rotational movement of same generates a translational movement of the casing 18 along the axis X of the screw.

In other words, there is an axial movement along the axis X between the screw 12 and the rollers 14, between the rollers 14 and the casing 18, and between the casing 14 and the screw 12. Thus, the reduction gear enables the element E to be moved in translation in response to a rotational movement of the motor M. The element E is for example linked to a brake pad designed to come into contact with a disk of a disk brake.

The joint translational movement of the casing and the element E is thus significantly reduced since the same results from a difference in the number of threads 12A, 14A, 18A between firstly the screw and the rollers and secondly the rollers and the casing, a difference in diameter between the screw and the casing, but also the inverted direction of the threads of the screw and of the rollers.

If the motor M is rotated in the opposite direction, the rotational and translational movements described above are inverted, thereby generating a translational movement of the element E in the opposite direction.

Other embodiments of the invention are described below with reference to FIGS. 2 to 5, in which the elements similar to the elements in FIG. 1 are indicated using the same reference signs.

FIG. 2 shows a second embodiment of a reduction gear 23, referred to as a two-stage reduction gear. This type of reduction gear 23, which is designed to be used as a brake actuator, includes elements substantially identical to the elements described above, specifically: a screw 12 with three threads 12A, rollers 14 provided with a thread 14A oriented in the opposite direction to the threads of the screw and a casing 18 provided with six inner threads 18A oriented in the same direction as the threads of the roller. In this embodiment, the rollers are referred to as inner rollers 14 and the casing is referred to as the inner casing 18. These elements are arranged in relation to one another as in the previous embodiment, with the exception of the shaft of the motor M, which is attached to the inner casing 18 instead of being attached to the screw 12. Also unlike the embodiment described previously, the screw 12 is rigidly attached to the frame containing the reduction gear and the motor M is mounted slidingly along the axis X in relation to the frame.

The reduction gear also includes supplementary elements designed to increase the reduction capacity of such a reduction gear. In this case, these supplementary elements are threaded outer rollers 28 and an outer casing 30.

The inner rollers 14 are therefore arranged about the screw 12 while the outer rollers 28 are arranged around the periphery of the inner casing 18 and, like the inner rollers 14, are each provided with a single thread 28A. The outer rollers 28 are seated in a cage (not shown) in a manner substantially identical to the manner described above, the diameter being adjusted to receive the inner casing 18 and the outer rollers 28.

The outer casing 30 surrounds the cage 26 and has a cylindrical shape coaxial with the screw 12. The outer casing 30 includes six threads 30A on the inner wall of same. An element E designed to be moved in translation is rigidly attached to one end 32 of the outer casing 30, which is entirely prevented from rotating.

The outer rollers 28 each mesh with the outer casing 30 and with the inner casing 18. The thread 28A of each outer roller 28 is oriented in the opposite direction to the threads 18A of the inner casing 18 and in the same direction as the threads of the outer casing 30.

Operation of the reduction gear 23 according to this second embodiment is described below. When the electric motor M is actuated in a first direction of rotation, the inner rollers 14, which are meshed directly with the inner casing 18, are driven in rotation about the axis X of the screw and also in rotation about themselves about their own axes. These rotational movements generate a translational movement T1 of the cage and of the rollers parallel to the axis X. Since the inner rollers 14 move in translation on the static screw 12, the inner casing 18 and the shaft of the motor M are driven by the inner rollers 14 in a translational movement T2 parallel to the axis X.

The outer rollers 28 are driven in rotation by the inner casing 18 and undergo a translational movement T3 parallel to the axis X.

Finally, the rotation of the outer rollers 28 drives the outer casing in a translational movement T4 parallel to the axis X.

A third embodiment is described below with reference to FIG. 3 in which, as in the preceding embodiments, the reduction gear is an electromechanical vehicle brake actuator 34 that is an integral part of a disk-brake braking device 35. Such a braking device 35 includes said actuator 34, a brake disks 38, brake pads 40A, 40B and a floating caliper 36.

The floating caliper 36 has an attachment portion 42, a disk gap 44 and a support jaw 48.

The end of the floating caliper with the attachment portion 42 is rigidly attached to the outer casing 30 of the reduction gear of the actuator 34. The other end of the floating caliper includes the support jaw 48 that extends parallel to the disk 38 and carries one of the pads 40B. Between the two ends of the floating caliper 36, the disk gap 42 forms a seat for the disk 38 and the pads 40A, 40B.

Conventionally, the brake pads 40A, 40B are arranged laterally on either side of the disk 38, each pad comprising a metal supporting element 46 covered with a lining 47. The inner brake pad 40A, in which the supporting element 46 is rigidly attached to one end 49 of the screw 12, is distinct from the outer pad 40B, in which the supporting element 46 is rigidly attached to the support jaw of the caliper. A deformable circular sealing gasket 50 is placed about the inner pad and links one edge of the inner brake pad to one edge of the outer casing. For this purpose, the pads, the caliper and the casing each have a seat 52 designed to receive the attachment portions of the seal. This seal is designed to entirely isolate the actuator from external contamination.

The actuator 34 includes a two-stage reduction gear that is substantially similar to the reduction gear in the second embodiment described above. The component parts are therefore arranged as before, with the exception in this embodiment that the screw 12 is designed to move in translation parallel to the axis X such that the screw forms a piston in which the end that is connected to the brake pad is designed to come into contact with the brake disk 38. In this example, the inner casing 30 driven by the motor does not move in translation.

Operation of the brake actuator 34 used in the above brake device 35 is described below.

When the electric motor M is driven in a first direction of rotation, the inner casing 18 rotates. The inner rollers 14, which are meshed directly with the inner casing 18, are driven in rotation about their own axis and about the axis X of the screw 12. The inner rollers are also moved in a translational movement T1' parallel to the axis X.

The rotation of the inner rollers 18 thus results in a translational movement T2' of the screw 12 along the axis X, in a direction referred to as a positive direction, such that the end 54 of the screw moves the inner brake pad 40A and pushes same against the brake disk 38 to generate a portion of the braking of the vehicle.

Furthermore, the rotation of the inner casing 18 drives the outer rollers 28 in rotation about their own axis and about the axis X. Moreover, the outer rollers undergo a translational movement T3' parallel to the axis X.

Finally, the rotation of the outer rollers 28 drives the outer casing 30 in a translational movement T4 parallel to the axis X, in a direction referred to as the negative direction, thereby causing a translational movement of the caliper in the negative direction. The outer pad 40B then comes into contact with the brake disk 38, thereby generating another portion of the braking of the vehicle. The disk 38 is then pressed between the two pads 40A, 40B.

When the shaft of the electric motor M turns in the other direction, the rotational and translational movements described above are inverted and the brake pads move in translation parallel to the axis X and away from the brake disk.

In a fourth embodiment of the invention, the reduction gear is a brake actuator 60 including a casing 18, a screw 12 and a motor E, as shown in FIG. 4. In this case, the actuator 60 does not have any rollers and the screw 12 is in mesh with the casing 18 by means of an irreversible connection. As before, the screw 12 has three threads 12A and the casing has six threads 18A. The shaft of the motor M is attached directly to the screw, and the casing forms a brake piston. It is therefore designed to be able to move in translation along the axis X in order to actuate a movable element of a braking device.

According to a fifth embodiment shown in FIG. 5, the actuator 70 includes a casing 18 rigidly attached to the shaft of the motor M, the screw 12 being movable in translation along the axis X. Accordingly, when the motor M is activated, the screw acts as brake piston and moves in translation along the axis X to actuate a movable element of a braking device.

The invention is not limited to the embodiments disclosed and other embodiments will be clear to the person skilled in the art. Notably and as a variant of the first embodiment, the electric motor may be connected to the casing 18, while the screw 12 is moved in translation to move the element E.

As a variant of the second embodiment, the reduction gear may include a static outer casing 30, while the screw 12 is moved in translation to move the element E.

Moreover, as a variant of the second or third embodiment, the motor need not be attached to the inner casing, but may drive one of the two seating cages for the rollers in rotation directly.

NOMENCLATURE

10: Reduction gear
12: Screw
12A: Screw threads
14: Rollers, inner rollers
14A: Thread of a roller, thread of an inner roller
16: Cage
18: Casing, inner casing
18A: Threads in the casing, threads in the inner casing
18B: Threads in the outer wall of the inner casing
20: End of the screw
21: Seats
22: End of the casing
23: Two-stage reduction gear
24: Positioning pins
26: Holes
28: Outer rollers
28A: Thread of an outer roller
30: outer casing
30A: Threads in the outer casing
32: End of the outer casing
34: Brake actuator
35: Braking device
36: Floating caliper
38: Brake disk
40: Brake pads
42: Attachment portion
44: disk gap 46: Supporting element
47: Lining
50: Sealing gasket
52: Seat
54: End of the screw 60: Brake actuator
70: Brake actuator
T1: Translational movement of the inner rollers
T2: Translational movement of the inner casing
T3: Translational movement of the outer rollers
T4: Translational movement of the outer casing
T1': Translational movement of the inner rollers
T2': Translational movement of the screw
T3': Translational movement of the outer rollers
T4': Translational movement of the outer casing
E: Element designed to be moved in translation
M: Electric motor
X: Axis of the screw

The invention claimed is:

1. A vehicle brake actuator, comprising:
a screw having first outer threads on an outer surface thereof,
a tapped inner casing encircling the screw such that the tapped inner casing is in mesh at least indirectly with the first outer threads of the screw by an irreversible connection,
a tapped outer casing having a braking element rigidly attached thereto,
an electric motor rigidly attached to the inner casing and configured to control movement of the screw in relation to the inner casing or of the inner casing in relation to the screw so that the inner casing forms a piston where said movement of the inner casing actuates the braking element rigidly attached to the outer casing,
a plurality of threaded inner rollers, the inner rollers each being in mesh with the screw and with the inner casing by at least one first inner thread, and
threaded outer rollers each in mesh with the inner casing and with the outer casing, the outer rollers having at least one second inner thread oriented in an opposite direction to a second outer thread of the inner casing and in same direction as a third inner thread of the outer casing.

2. The vehicle brake actuator as claimed in claim 1, wherein the screw has a plurality of screw threads and the inner casing has a plurality of the second outer threads.

3. The vehicle brake actuator as claimed in claim 1, wherein the first inner thread of each inner roller is oriented in the opposite direction to a corresponding screw thread of the screw and in the same direction as a corresponding second outer thread of the inner casing.

4. The vehicle brake actuator as claimed in claim 1, wherein the inner rollers mesh directly with the screw and the inner casing.

5. The vehicle brake actuator as claimed in claim 1, wherein the inner casing forms a piston designed to actuate the braking element.

6. A vehicle brake actuator, comprising:
a screw having first outer threads on an outer surface thereof,
a tapped inner casing encircling the screw such that the tapped inner casing is in mesh at least indirectly with the first outer threads of the screw by an irreversible connection, the inner casing having a braking element rigidly attached thereto,
an electric motor rigidly attached to the screw and configured to control movement of the screw in relation to the inner casing or of the inner casing in relation to the screw so that the screw forms a piston where said movement of the screw actuates the braking element rigidly attached to the inner casing,
a plurality of threaded inner rollers, the inner rollers each being in mesh with the screw and with the inner casing by at least one first inner thread,
a roller holding cage holding the inner rollers,
a tapped outer casing, and
threaded outer rollers each in mesh with the inner casing and with the outer casing, the outer rollers having at least one second inner thread oriented in an opposite direction to a second outer thread of the inner casing and in same direction as a third inner thread of the outer casing.

7. A vehicle braking device including the vehicle brake actuator according to claim 1, designed to actuate a disk brake.

8. A vehicle provided with the vehicle braking device according to claim 7, wherein the vehicle brake actuator is designed to actuate a service brake or a parking brake.

* * * * *